United States Patent
Bremer et al.

(10) Patent No.: US 11,925,177 B2
(45) Date of Patent: Mar. 12, 2024

(54) CONTINUOUSLY-VARIABLE NOZZLE SYSTEM WITH INTEGRATED FLOW METER

(71) Applicant: Intelligent Agricultural Solutions LLC, Fargo, ND (US)

(72) Inventors: Marshall T. Bremer, Fargo, ND (US); Nicholas Butts, West Fargo, ND (US); Todd A. Meidinger, Fargo, ND (US); Benjamin J. Wolbaum, Fargo, ND (US); Daniel R. Wood, Jr., Fargo, ND (US); Michael D. Schmidt, Fargo, ND (US)

(73) Assignee: Intelligent Agricultural Solutions LLC, Fargo, ND (US)

( * ) Notice: Subject to any disclaimer, the term of this patent is extended or adjusted under 35 U.S.C. 154(b) by 709 days.

(21) Appl. No.: 17/048,731

(22) PCT Filed: Apr. 9, 2019

(86) PCT No.: PCT/US2019/026600
§ 371 (c)(1),
(2) Date: Oct. 19, 2020

(87) PCT Pub. No.: WO2019/204085
PCT Pub. Date: Oct. 24, 2019

(65) Prior Publication Data
US 2021/0176977 A1 Jun. 17, 2021

Related U.S. Application Data

(60) Provisional application No. 62/660,895, filed on Apr. 20, 2018.

(51) Int. Cl.
*A01M 7/00* (2006.01)
*B05B 12/08* (2006.01)
*B05B 15/658* (2018.01)

(52) U.S. Cl.
CPC .......... *A01M 7/0089* (2013.01); *A01M 7/006* (2013.01); *A01M 7/0042* (2013.01); *B05B 12/085* (2013.01); *B05B 15/658* (2018.02)

(58) Field of Classification Search
CPC ... B05B 12/04; B05B 12/085; B05B 12/1418; A01M 7/0089; A01M 7/0042; A01M 7/006; G01F 1/056
See application file for complete search history.

(56) References Cited

U.S. PATENT DOCUMENTS 3,861,210 A * 1/1975 Griverus ................ G01F 1/056
73/861.32
4,157,660 A * 6/1979 Spacek .................. G01F 1/056
73/861.05

(Continued)

FOREIGN PATENT DOCUMENTS

CN 201565393 U 9/2010
EP 1346637 A1 9/2003

(Continued)

OTHER PUBLICATIONS

Great Britain Search Report for GB Application No. GB1813015.3, dated Jan. 28, 2019, p. 3.

(Continued)

*Primary Examiner* — Tuongminh N Pham

(57) ABSTRACT

A continuously variable nozzle system includes a nozzle body (5) with an inlet and an outlet. A conduit is defined between the inlet and the outlet by a series connection of components which includes a flow meter (10). The flow meter (10) has a chamber (83) with internal helical splines (82) that are configured to interact with a spray liquid passing through the chamber (83) and create a cyclone-like effect. A sphere (52) is located inside the chamber (83) for free movement along a circular path (106). A sensor is located outside of the chamber (83) and configured to detect (Continued)

Figure 1:
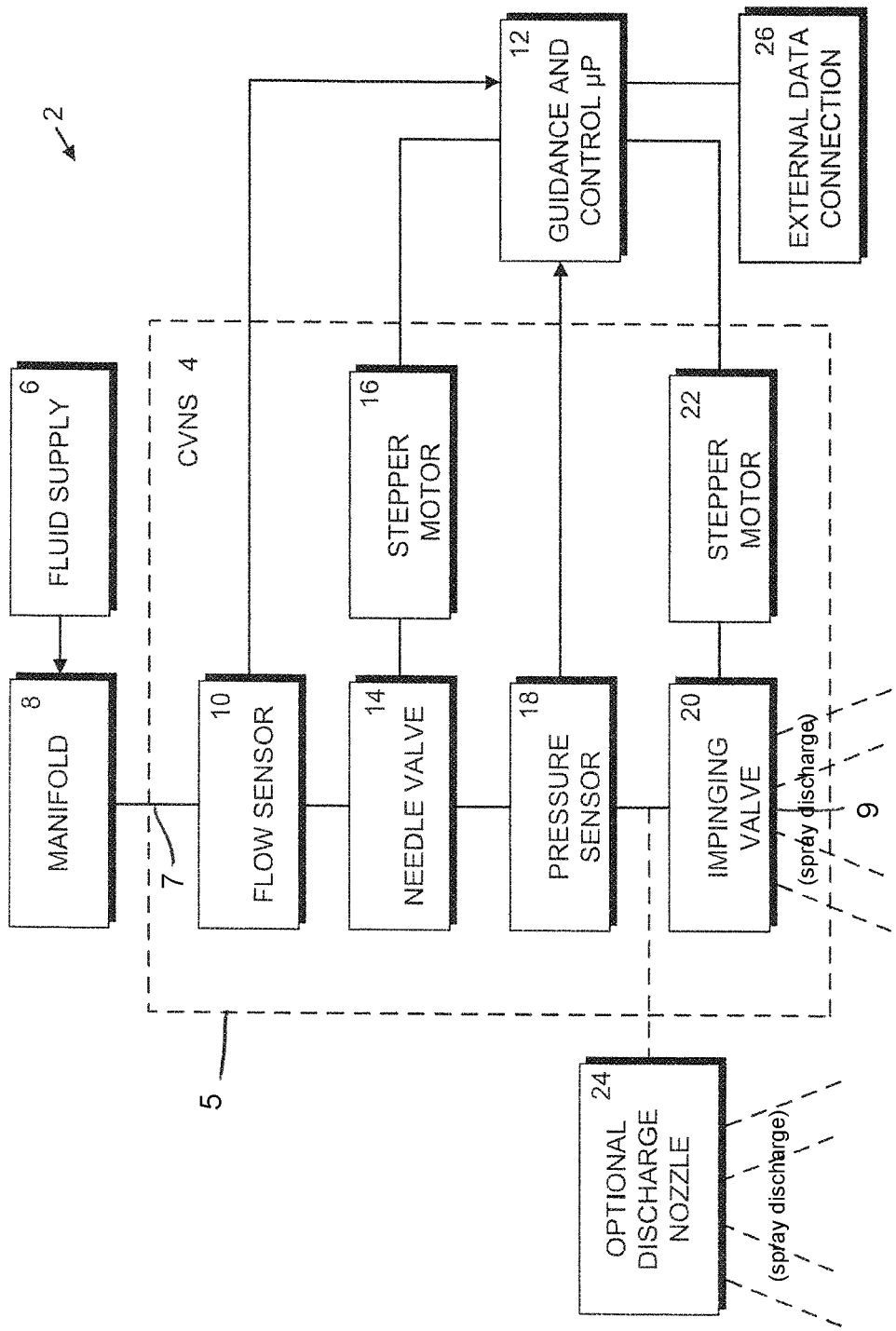

motion of the sphere (52) and generate an output (9) signal in response to detected motion.

17 Claims, 17 Drawing Sheets

(56) References Cited

U.S. PATENT DOCUMENTS

| | | | |
|---|---|---|---|
| 9,532,563 B2 | 1/2017 | Arenson et al. | |
| 2012/0000991 A1 | 1/2012 | Hloben | |
| 2013/0037625 A1* | 2/2013 | Arenson | A01M 7/0089 239/71 |
| 2013/0284827 A1* | 10/2013 | Humpal | B05B 1/1645 239/549 |
| 2015/0115058 A1 | 4/2015 | Wilger | |
| 2016/0178422 A1* | 6/2016 | Humpal | G01F 1/69 239/71 |
| 2019/0226887 A1* | 7/2019 | Peters | G01F 1/05 |
| 2019/0350187 A1* | 11/2019 | Kocer | B05B 1/326 |

FOREIGN PATENT DOCUMENTS

| | | |
|---|---|---|
| GB | 1556139 | 11/1979 |
| WO | WO2018052293 A1 | 3/2018 |

OTHER PUBLICATIONS

International Search Report and Written Opinion for PCT Application No. PCT/US2019/026600, dated Jan. 7, 2019, p. 12.

* cited by examiner

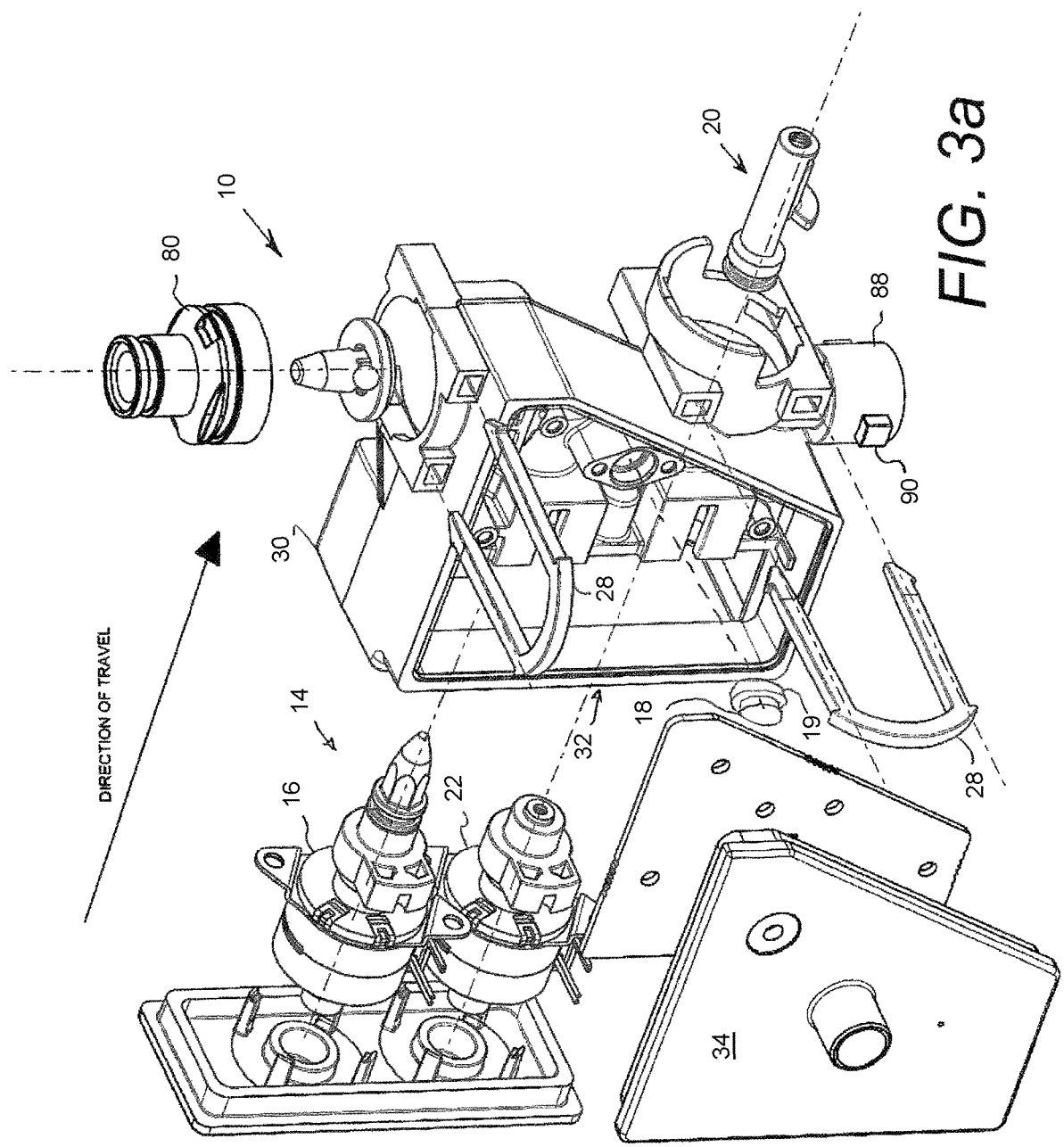

CLOSED

OPEN

CLOSED

OPEN

CONTINUOUSLY-VARIABLE NOZZLE SYSTEM WITH INTEGRATED FLOW METER

BACKGROUND OF THE INVENTION

1. Field of the Invention

The present invention relates generally to a continuously-variable nozzle system (CVNS), and in particular to a system for interactively controlling operational variables in an automated or autonomous agricultural sprayer.

2. Description of the Related Art

Liquid application systems have utilized a wide variety of nozzle configurations and spray operation controls, which are generally based on the liquids being sprayed, environmental factors and other operational considerations. Without limitation, an exemplary application of the present invention is in a mobile agricultural spraying system, which applies liquids to field crops. Such liquids can comprise herbicides, pesticides, liquid fertilizers, nutrients and other substances. Crop field spray operations generally have the objectives of optimizing crop yields, maximizing spray operation efficiency (e.g., material usage) and minimizing unintended spray operation consequences (e.g., spray drift onto neighboring fields).

Spraying system operating condition variables generally include liquid viscosities, pump pressures, discharge nozzle configurations and fluid flow rates. These and other aspects of a spraying system can be controlled to deliver more or less liquid to target surfaces. However, changing the operating pressures and the flow rates in spraying systems can have adverse effects on other operational variables, such as droplet sizes and spray fan angles. For example, if the droplets are too small, the spray can be more susceptible to drift, even in relatively light wind conditions. Unintended drift of agricultural chemicals onto neighboring fields, water supply sources, non-cultivated land, livestock and individuals is generally undesirable. For example, spray operations which may be desirable for a target crop could be harmful to other crops located in adjacent fields. Accidental applications of harmful agricultural chemicals can create financial liabilities for applicators.

Another potential problem with spray operations relates to coverage gaps. For example, decreasing pressure can shrink spray pattern coverage, resulting in unintended coverage gaps and compromising spray operation effectiveness. Environmental conditions can also affect agricultural spraying system performance. For example, temperature and humidity can affect the spray material droplets and alter plant absorption. Effective spraying systems, especially for agricultural applications, preferably provide selective and/or individual control of the spray nozzles. Such control functionality can minimize overlapping spray patterns. It can also enable sectional control of the equipment by independently controlling individual nozzles or equipment sections with multiple nozzles. Relatively accurate spray patterns and material application rates can thus be achieved. For example, varying amounts of chemicals can be applied at different locations, e.g., based on criteria such as equipment sensor readings and pre-determined field conditions. Equipment turns causing differential nozzle ground speeds can also be accommodated because nozzles located over the sprayer-swath outside edges have higher ground speeds than nozzles located over the inside edges of equipment turns. Still further, equipment with differential nozzle control capabilities can automatically compensate for reduced-flow conditions, e.g., caused by worn and defective nozzles.

Croplands, pastures and other fields can be effectively sprayed using appropriate guidance and navigation systems. Current state-of-the-art agricultural vehicles commonly use a Global Navigation Satellite System (GNSS), such as the U.S.-based Global Positioning System (GPS), for precision guidance, prescription farming and material placement.

US-2017/0036228 discloses an intelligent spray nozzle having an input pressure sensor, a flow sensor, a flow modulator, a nozzle pressure sensor and an output orifice modulator. An output from the flow sensor is used to control the flow modulator and the output orifice modulator to control an output spray rate. An ultrasonic-based sensor and "time of flight" principal is used to measure the fluid flow.

The continuously variable nozzle system of the present invention addresses these sprayer performance objectives, and overcomes many of the deficiencies with prior art nozzle and control systems. Heretofore there has not been available a continuously variable nozzle system with the features and elements of the present invention.

BRIEF SUMMARY OF THE INVENTION

In accordance with an aspect of the present invention, a continuously-variable nozzle system (CVNS) is provided for a sprayer, such as an agricultural sprayer. The nozzle system is configured for connection to a spray liquid source and configured for continuously, variably controlling a spray characteristic. The nozzle system comprises a nozzle body with an inlet and an outlet, a conduit between the inlet and the outlet, and a flow meter disposed in the conduit. The flow meter comprises a chamber with internal helical splines configured to interact with a spray liquid passing through the chamber and create a cyclone-like effect, a sphere disposed inside the chamber for free movement along a circular path, and a sensor disposed outside the chamber and configured to detect motion of the sphere and generate an output signal in response to detected motion.

The invention delivers a "smart" nozzle system with a flow meter that has been found to be highly accurate when measuring very low flow rates or rapidly changing flow rates. This is due to the low friction and low inertia of the sphere arrangement. Furthermore the flow meter of the present invention is more reliable and robust compared to known flow meters for individual nozzles.

The nozzle system may be connected to a spray material source and configured to automatically control fluid pressures, discharge volume rates, droplet sizes and discharge spray patterns.

The flow meter preferably comprises an upper section, wherein the upper section comprises an outer wall of the chamber, and wherein the helical splines are provided on an inner surface of the outer wall. The flow meter may further comprise a lower section comprising a cone that projects from the base into the chamber, wherein the cone is aligned on a central axis, and wherein the circular path is disposed between the cone and the outer wall. In one preferred embodiment the upper section comprises a transparent material and the sensor is a photodiode that 'looks' through the transparent material at the sphere. A light source may be provided outside the chamber to illuminate the sphere and improve detection reliability by the photodiode.

In one embodiment an automated control system includes a microprocessor configured for receiving input signals representing operating condition variables and providing output signals for controlling adjustable sprayer parameters. The control system includes a feedback loop functions for interactively modifying sprayer parameters in real-time, responding to field, weather, crop and other conditions.

In a preferred embodiment the nozzle system further comprises a flow control valve disposed in the conduit, and an actuator for controlling the flow control valve. Advantageously, the flow control valve permits nozzle-by-nozzle regulation of the flow rate of spray liquid. The flow control valve is preferably a needle valve although other types of valve are viable. The actuator may be provided by a stepper motor for example. Alternatively, a voice coil (or non-commutated DC linear) actuator may be employed.

In another preferred embodiment the nozzle system may further comprise an electronic controller that is in communication with the sensor and the actuator for control of the flow control valve, wherein the controller is configured to compute a flow rate from the output signal and control the actuator in dependence upon the flow rate.

A pressure sensor may be mounted in the conduit downstream of the flow meter and configured to generate a pressure signal, wherein the controller is in communication with the pressure sensor and configured to receive the pressure signal. In one example of the system in operation a supply pressure of the spray liquid source and the flow control valve is controlled in dependence upon the measured flow rate and the nozzle pressure so as to maintain a desired flow rate and spray pattern.

The nozzle system may further comprise an impinging valve disposed in the conduit downstream of the flow control valve, and a further actuator for controlling the impinging valve, wherein the impinging valve serves to modify a mean droplet size of a spray output. Advantageously, the provision of an impinging valve in addition to a flow control valve permits a high degree of nozzle-by-nozzle control of the output spray characteristics, especially with regard to droplet size and flow rate.

The nozzle system can be embodied, by way of example only, in a sprayer that can be configured as a self-propelled vehicle, a mounted or a towed implement, or an unmanned aerial vehicle.

The CVNS of the present invention is adaptable for retrofitting in aftermarket installations, and for original equipment manufacturing (OEM) applications. The modular design accommodates such various applications.

BRIEF DESCRIPTION OF THE DRAWINGS

Further advantages of the invention will become apparent from reading the following description of specific embodiments with reference to the accompanying drawings. The drawings constitute a part of this specification and include exemplary embodiments of the present invention illustrating various objects and features thereof.

FIG. 1 is a block diagram of an automated sprayer including a continuously variable nozzle system (CVNS) embodying an aspect of the present invention.

FIG. 2 is a front, perspective view of the CVNS.

FIG. 3*a* is a front, upper, right side perspective view of the CVNS, shown in an exploded configuration.

FIG. 3*b* is another front, upper, right side perspective view of the CVNS, shown in an exploded configuration.

FIG. 4*a* is a vertical, cross-section thereof in a closed configuration.

FIG. 4*b* is another vertical cross-section thereof in an open configuration.

FIG. 5 is a perspective view of a linear stepper motor thereof, mounting a needle valve.

FIG. 6 is another perspective view of the linear stepper motor, particularly showing a junction box thereof.

FIG. 7 is an enlarged, cross-section with an impinging valve or nozzle subassembly in a closed position, taken generally in circle 7 in FIG. 4*a*.

FIG. 8 is an enlarged, cross-section with the impinging valve or nozzle subassembly in an open position, taken generally in circle 8 in FIG. 4*b*.

FIG. 9 is an enlarged, cross-section of the impinging valve or nozzle subassembly.

FIG. 10 is an enlarged, cross-section of the impinging valve or nozzle subassembly, taken generally in circle 10 in FIG. 8.

FIG. 11 is a perspective view of the impinging valve or nozzle subassembly.

FIG. 11*a* is a perspective view of the impinging nozzle insert.

FIG. 11*b* is a perspective view of the impinging nozzle valve.

FIG. 12 is a cross-section of a flow meter of the CVNS, taken generally in circle 12 in FIGS. 4*a* and 4*b*.

FIG. 13 is an enlarged, fragmentary view of the flow meter an adjacent enclosure panel mounting and LED and a photodiode sensor for detecting passage of a tracking ball.

FIG. 14 is an enlarged, fragmentary top plan view of portions of the flow meter shown, taken generally along line FIG. 14 in FIG. 13.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Sprayer 2

In the practice of an aspect of the present invention, a CVNS 4 is shown in a sprayer 2. Without limitation on the generality of useful applications of the present invention, the sprayer 2 can be configured for agricultural sprayer applications, e.g., either self-propelled, mounted or towed behind a tractor. As shown in FIG. 1, a fluid supply 6 is connected to a generally horizontal tubular supply manifold 8, which can be mounted in front of or behind a vehicle and supported on a boom structure. For agricultural operations, the manifold 8 can extend substantially the width of a crop field swath, e.g., with multiple CVNSs 4 mounted thereon at spaced intervals corresponding to respective crop row spacing.

Each CVNS 4 comprises a nozzle body 5 having an input 7 and an output 9 shown diagrammatically in FIG. 1. Fluid enters the CVNS 4 through input 7 into a flow meter 10 (described in more detail below), which generates an output signal corresponding to the flow rate, which signal is input to the guidance and control microprocessor 12. The fluid flow rate is automatically controlled by a needle valve 14 connected to a linear stepper motor 16. A pressure sensor 18 monitors fluid pressure and outputs a corresponding signal for input to the microprocessor 12.

The fluid enters an impinging valve 20 controlled by another linear stepper motor 22 connected to the microprocessor 12. Depending on the impinging valve 20 open/closed condition, fluid either discharges from the impinging valve 20 or is diverted to an optional discharge valve 24. A fluid-conveying conduit is thus provided between the input 7 and output 9 a series connected plurality of components including the flow meter 10, needle valve 14 and impinging valve 20.

The guidance and control microprocessor 12 receives inputs from the flow meter 10, the pressure sensor 18 and, optionally, from an external data connection 26. The external data connection 26 can comprise a variety of resources, such as the Internet (e.g., via the "Cloud") an operator, a smart device, a LAN, a WAN, electronic storage media, etc. Moreover, multiple vehicles and equipment pieces with CVNSs can be linked and their operations coordinated. Such vehicles and equipment pieces can be assigned individual operators, or can operate autonomously.

III. Continuously-Variable Nozzle System (CVNS) 4

Figure 2:
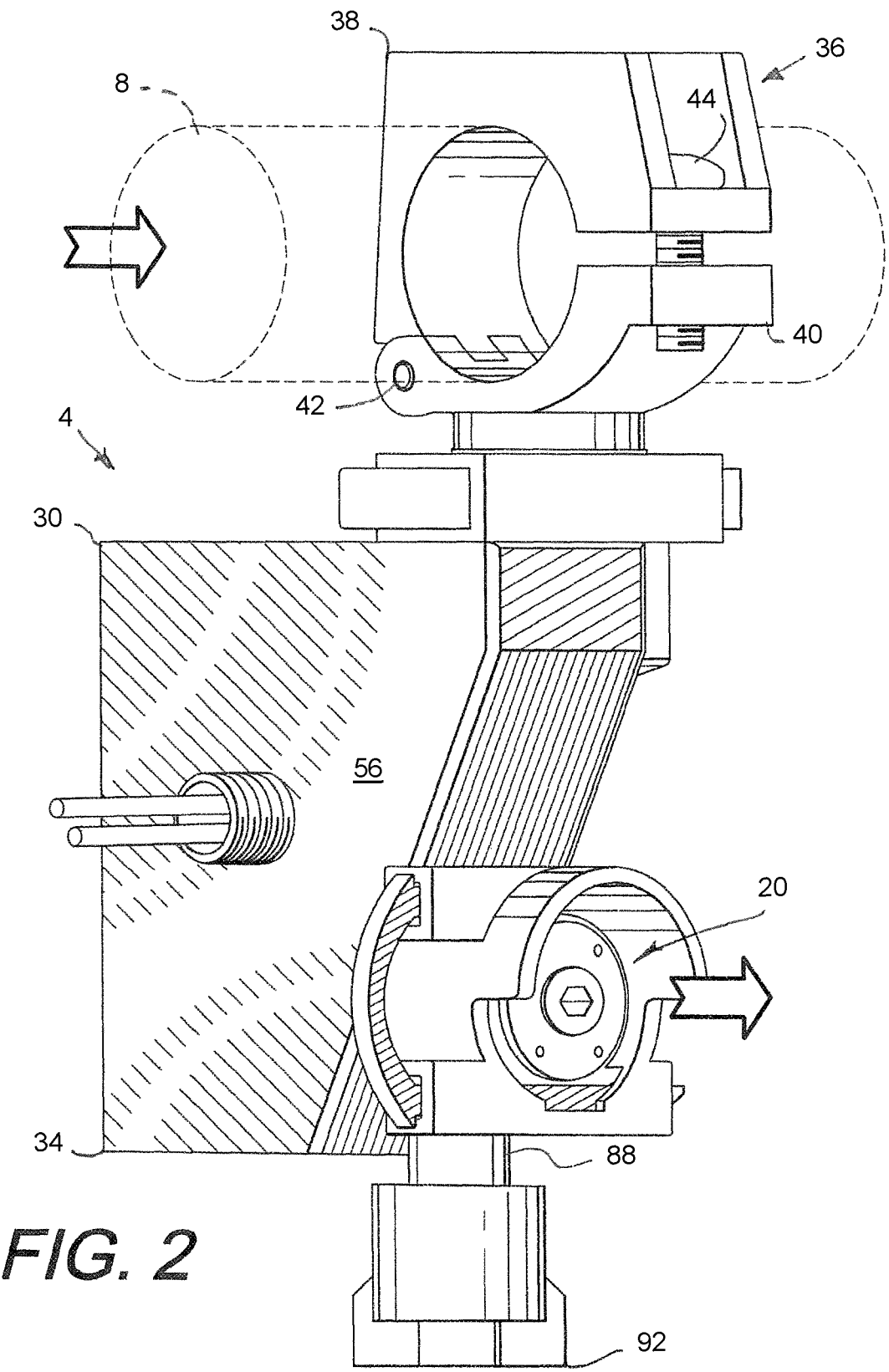

As shown in FIG. 2, the nozzle body 5 defines an enclosure 30, which can comprise a high-density, whereresistant material, e.g., Acetal plastic. However, the enclosure 30, and other components of the CVNS 4, can comprise other durable materials, including metals, ceramics, etc. The enclosure 30 generally comprises a mounting frame 32 and a cover 34, which can comprise injection-molded components. The CVNS 4 is attached to the manifold 8 by a plug-in, modular, boom mounting clamp 36 with upper and lower jaws 38, 40 (e.g., injection molded plastic) digitally connected by a pressed hinge pin 42 and clamp together by a clamping bolt fastener 44. Connections throughout the CVNS 4 can be sealed fluid-tight by appropriate O-rings, gaskets, sealants and other connecting devices and techniques. Without limitation, O-rings are shown and are generally designated 46. The lower jaw 40 includes a pipe insert 48 with slots 50 allowing complete drainage of fluids in the manifold 8 to the CVNS 4.

Figure 3B:
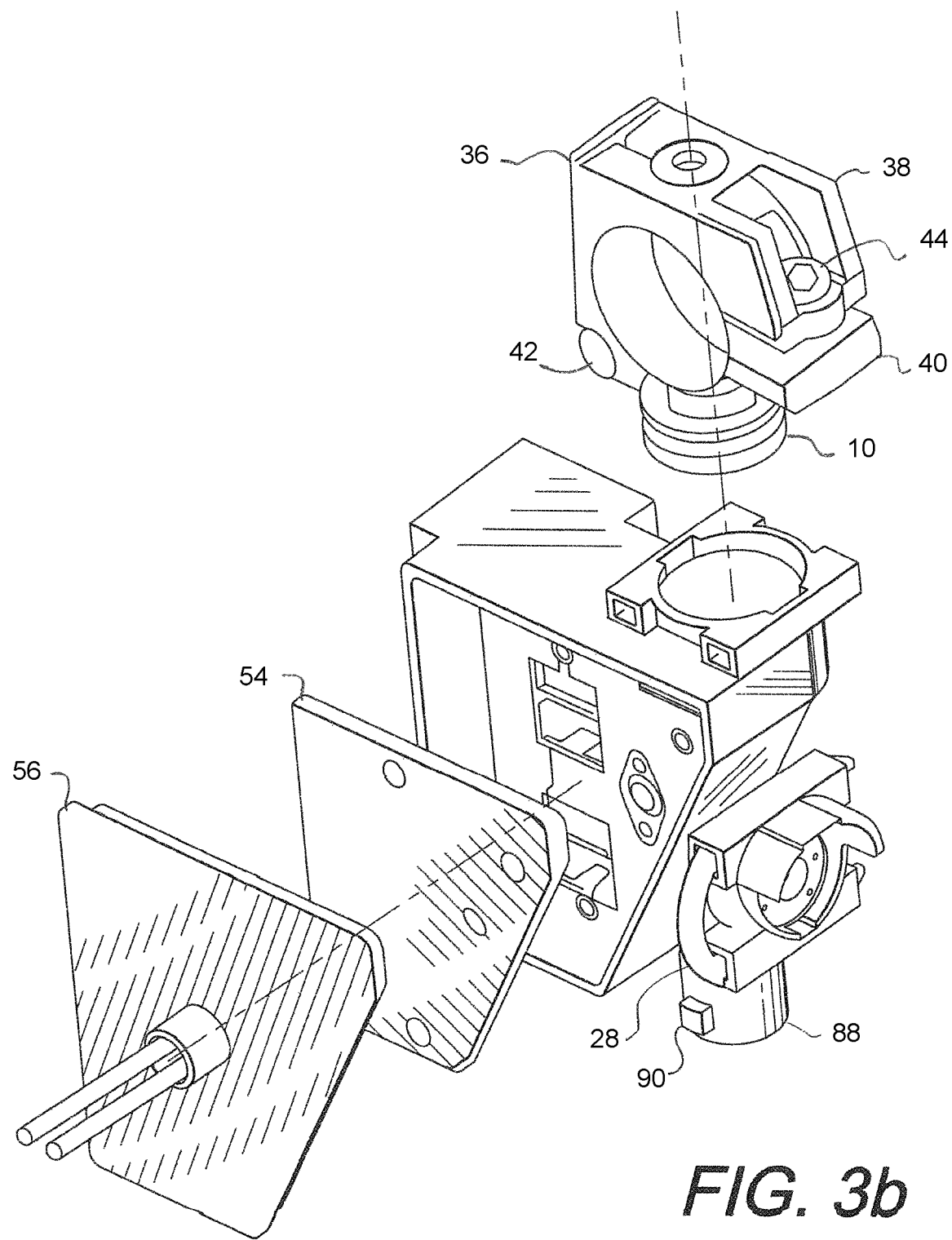

As shown in FIG. 3a. the flow meter or sensor 10 and the impinging valve or nozzle subassembly 20 can be secured to the enclosure 30 by suitable U-shaped clips 28.

Figure 4A:
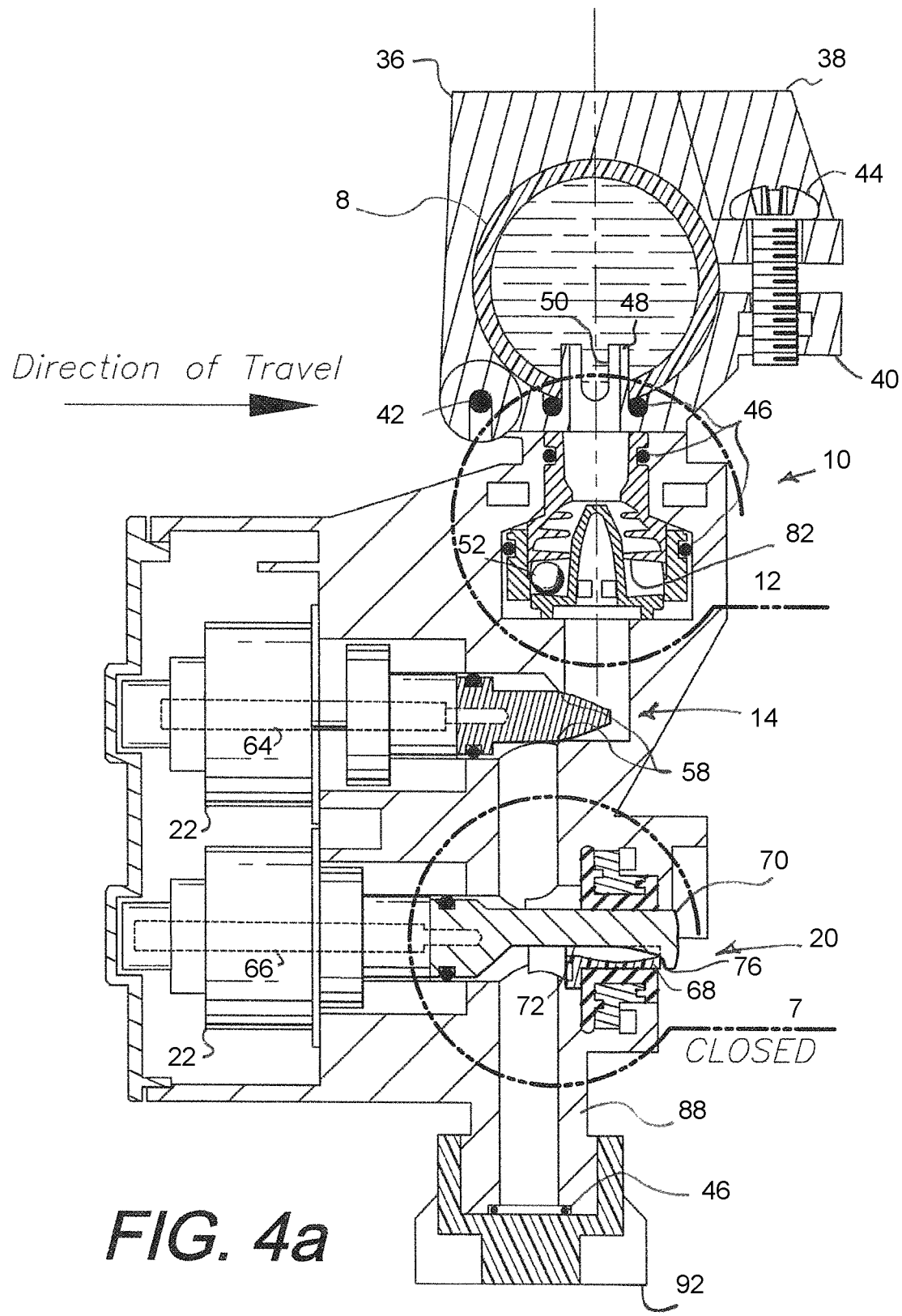
Figure 4B:
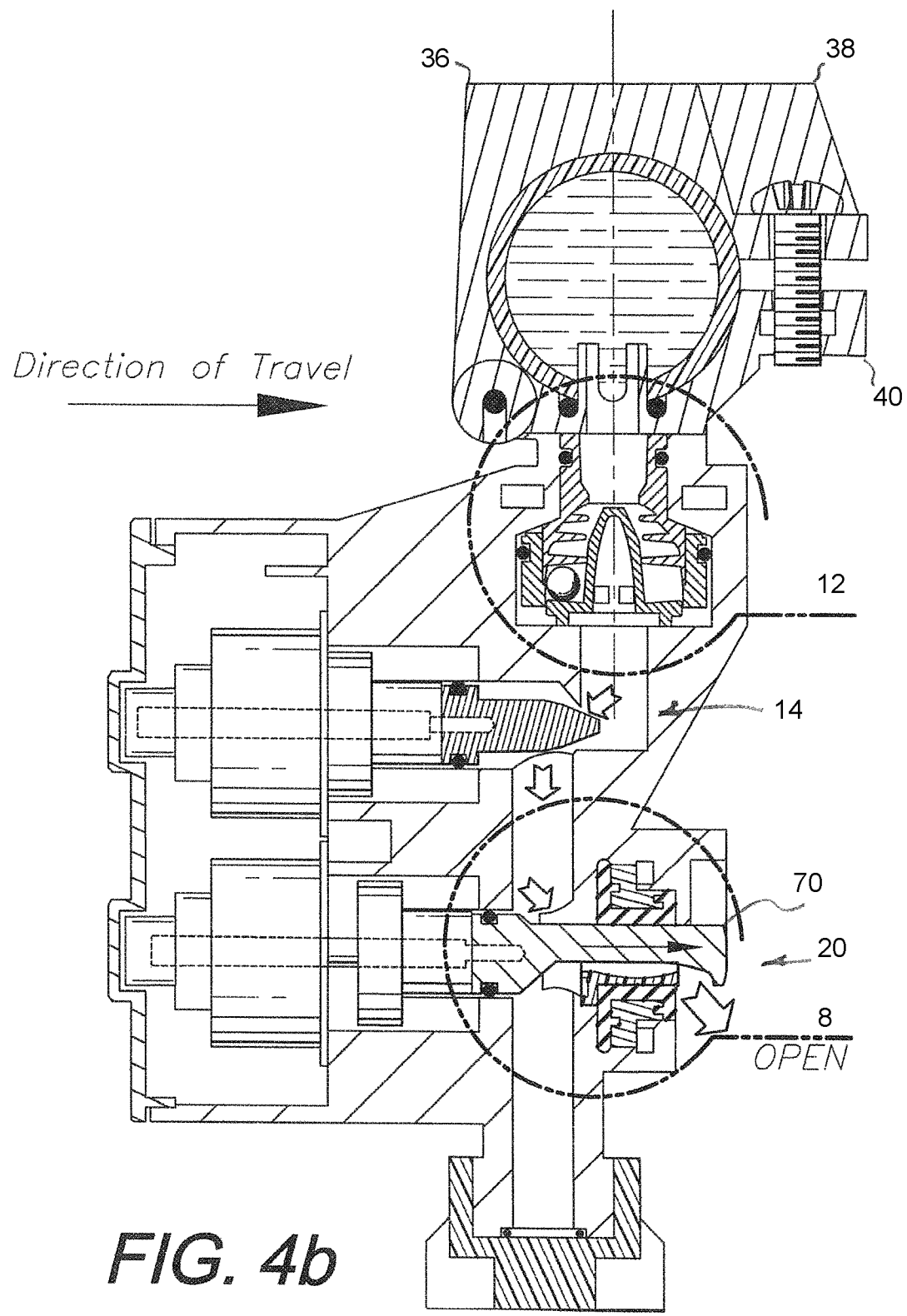

As shown in FIGS. 4a and 4b, the CVNS 4 has closed and open configurations respectively. For example, FIG. 4a shows both the needle valve 14 and the impinging valve 20 closed. With the valves 14, 20 open (FIG. 4b) fluid enters from the boom or manifold 8 through an opening in the boom mounting clamp 36, enters the flow meter 10 and spins a sphere 52 located therein. The needle valve 14 is mounted on a linear actuator, which can comprise a stepper motor 16, which varies the flow, either incrementally (e.g., with a stepper motor as shown) or continuously. Pressure in the enclosure 30 can be monitored by the pressure sensor 18, which can comprise a diaphragm gasket-type construction for mounting on a printed circuit board (PCB) 54 forming a sidewall of the enclosure 30 and closed by a side cover panel 56 (FIG. 3a). The needle valve 14 controls droplet size, fluid pressure and flow rate.

Figure 5:
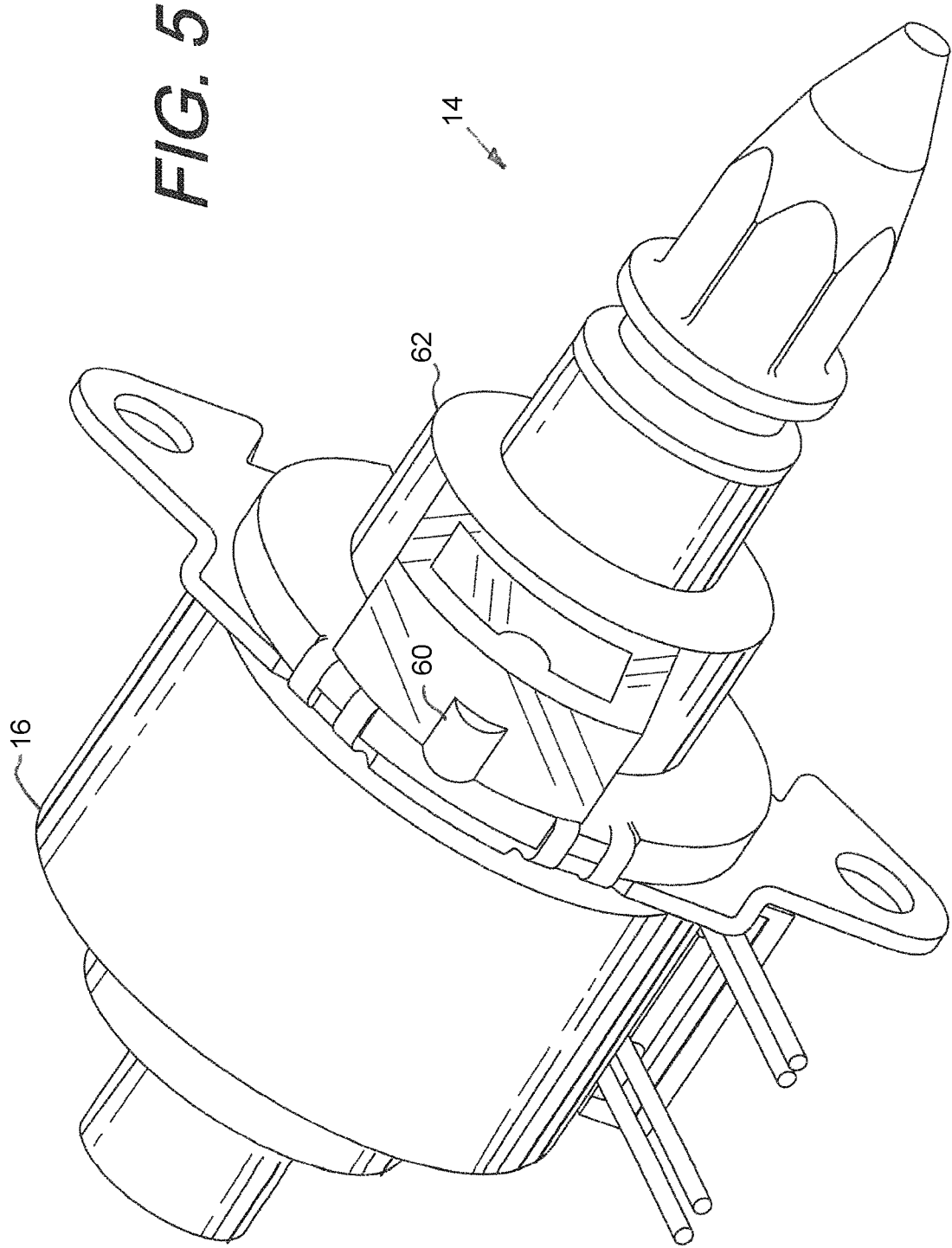

A needle valve seat 58 acts as a seal against the needle valve 14 as the needle valve closes down to restrict flow. As the fluid passes through the CVNS 4, the pressure of the fluid is read by the pressure sensor 18, which is covered by a gasket 19 preventing fluid from directly contacting the sensor 18 and the PCB 54. The positions of the needle valve 14 and the impinging valve 20 are monitored with a magnet 60, which is pressed into a magnet holder 62 mounted on and sliding with respective motor shafts 64, 66. The magnets 60 interact with magnet sensors (not shown) in the enclosure 30, which provide output signals to the controller 12 for monitoring and controlling the positions of the valves 14, 20, e.g., through an appropriate feedback loop. The needle valve 14 (FIG. 5) can comprise a relatively soft material, such as brass or acetyl thermoplastic. In one embodiment the needle valve 14 is formed from a polyoxymethylene (POM), (also known as acetal, polyacetal), and polyformaldehyde, as commonly used in precision parts requiring high stiffness, low friction, and excellent dimensional stability. Relatively tight tolerances or preferably provided with a relatively precise cone shaped to allow for proper sealing. As shown, the needle valve 14 has a dual-ramp configuration, or is otherwise variably contoured geometrically for optimizing a linear or otherwise defined flow rate response.

Figure 6:
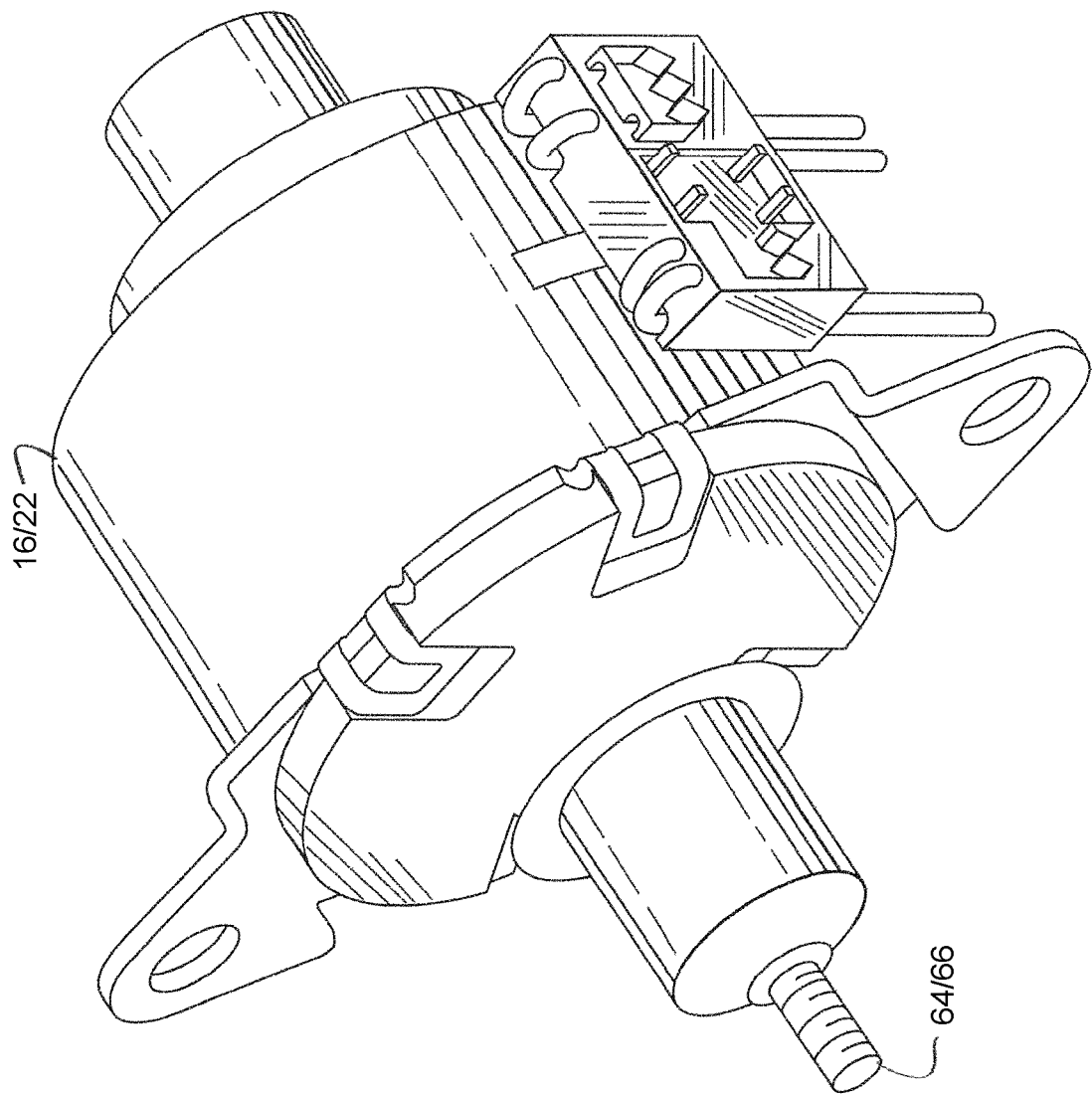

As shown in FIG. 6, the motors 16, 22 can include suitable junction boxes with electrical and mechanical connections to other components of the CVNS 4.

Figure 7:
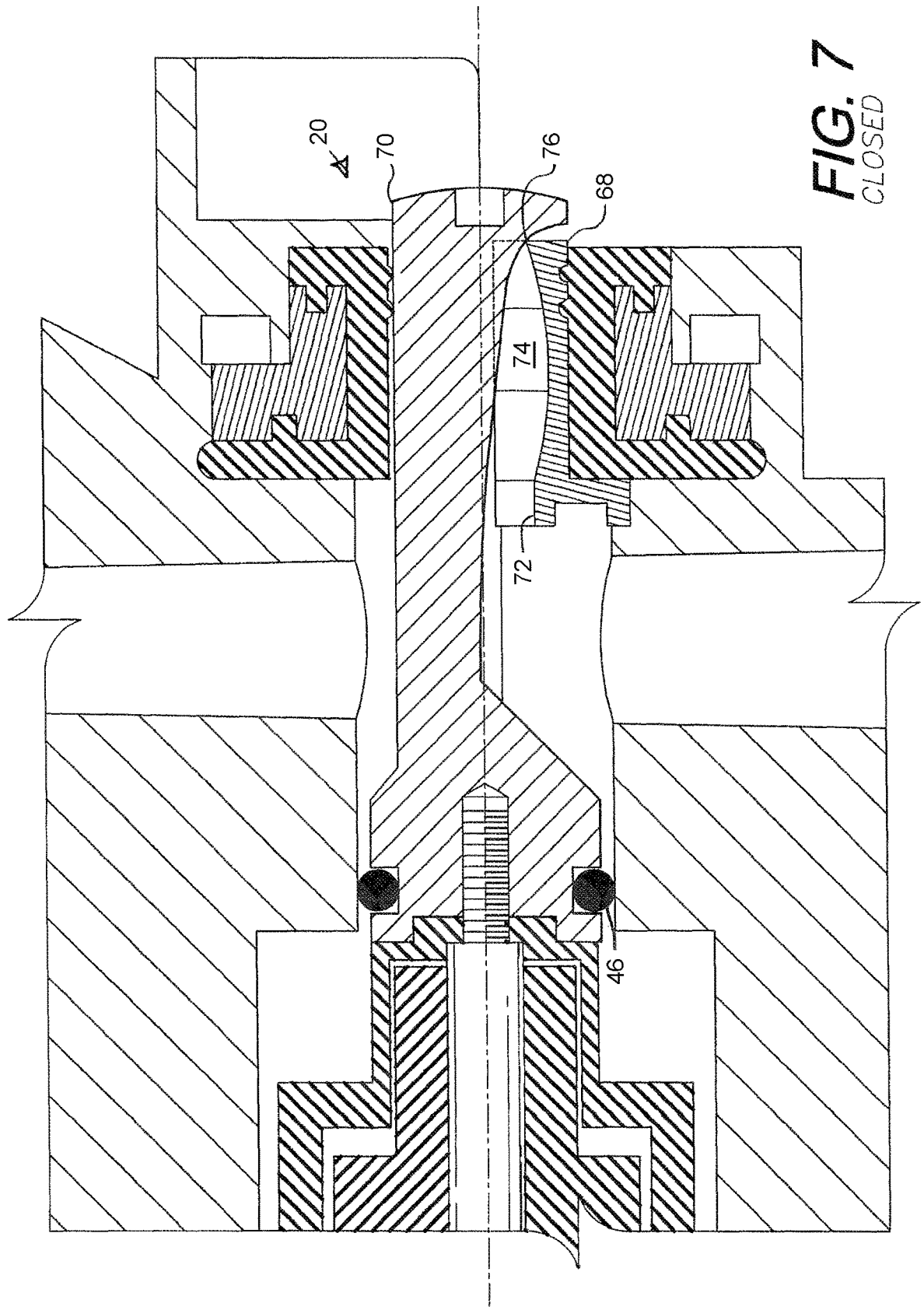
Figure 8:
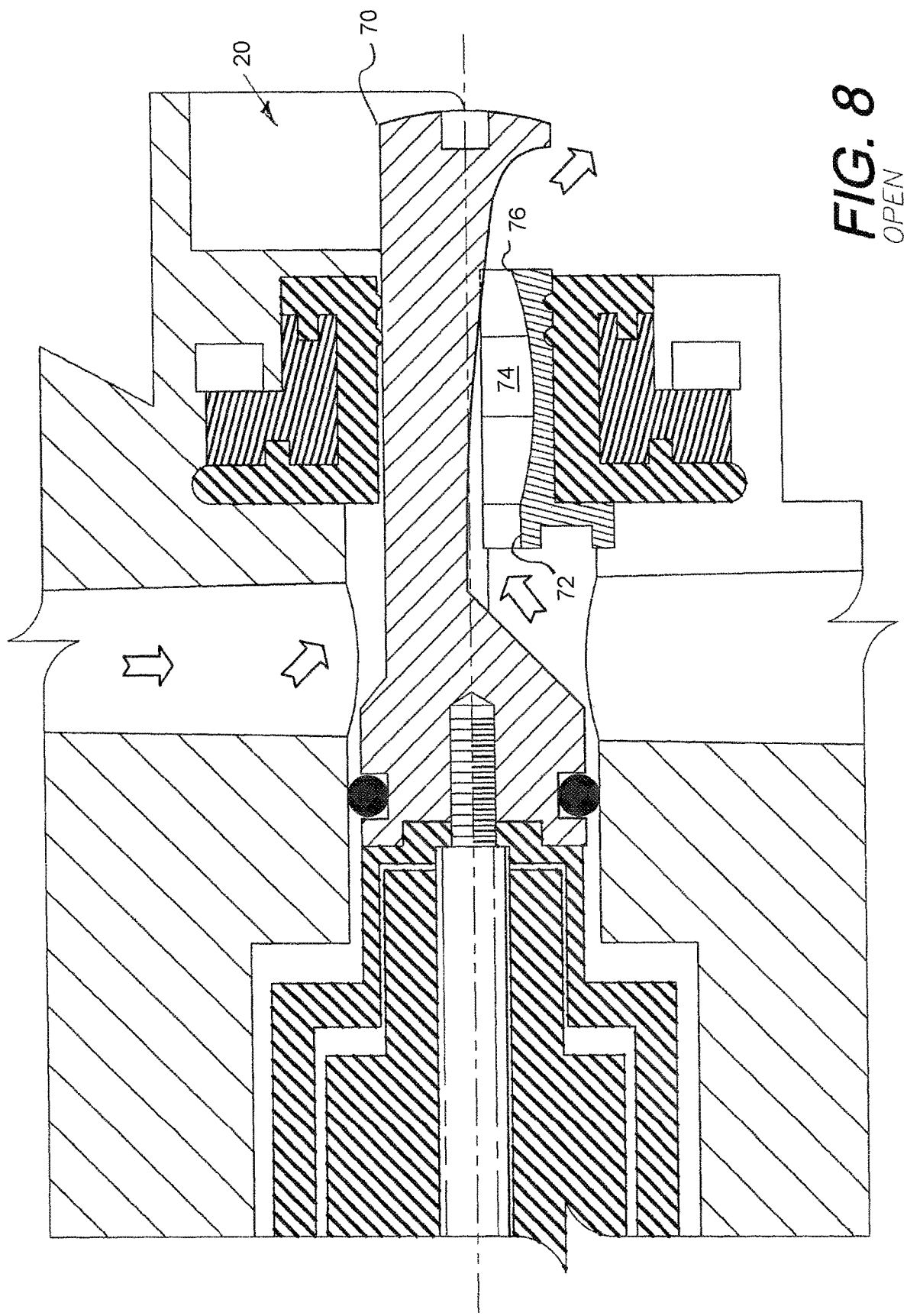
Figure 9:
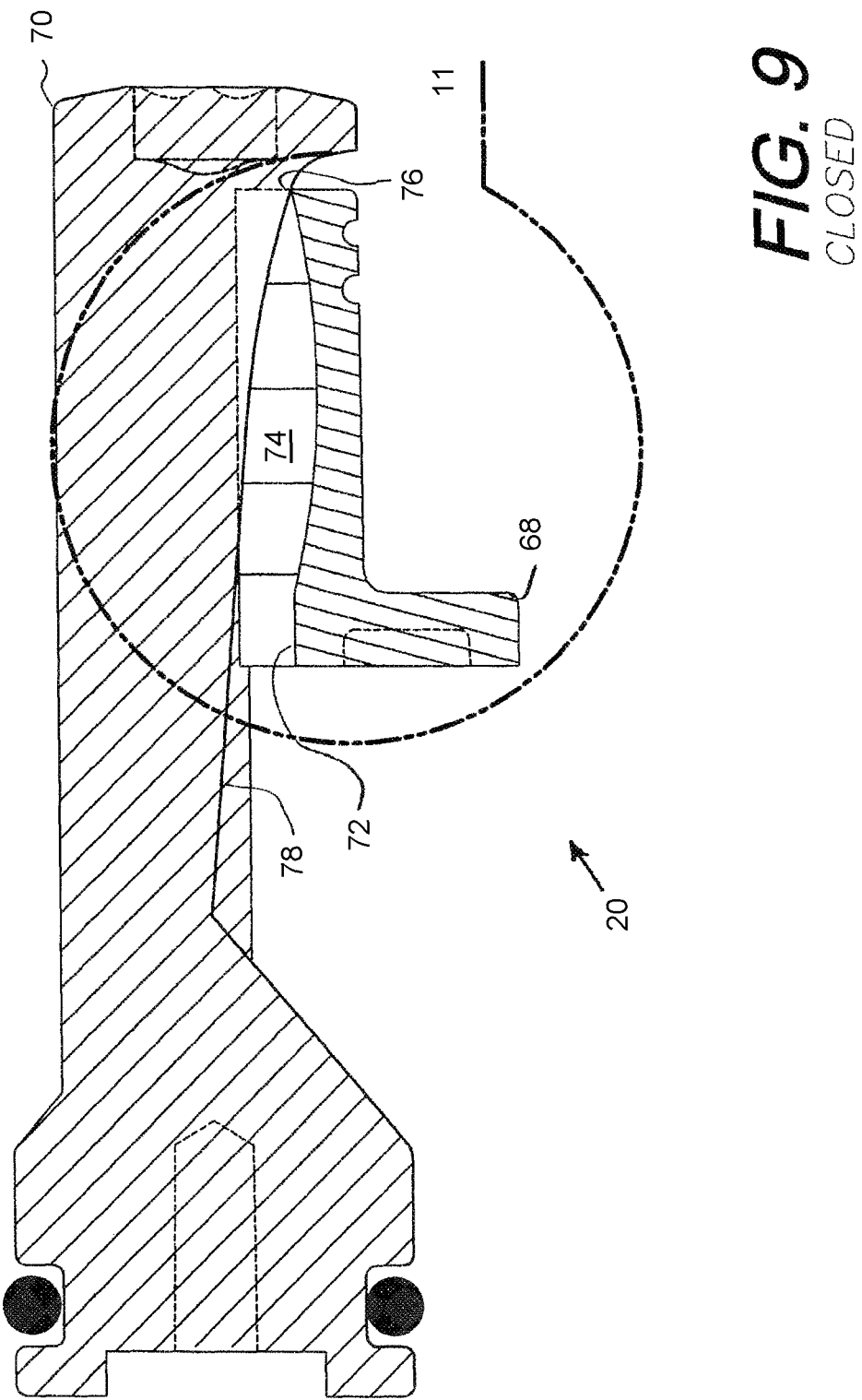
Figure 10:
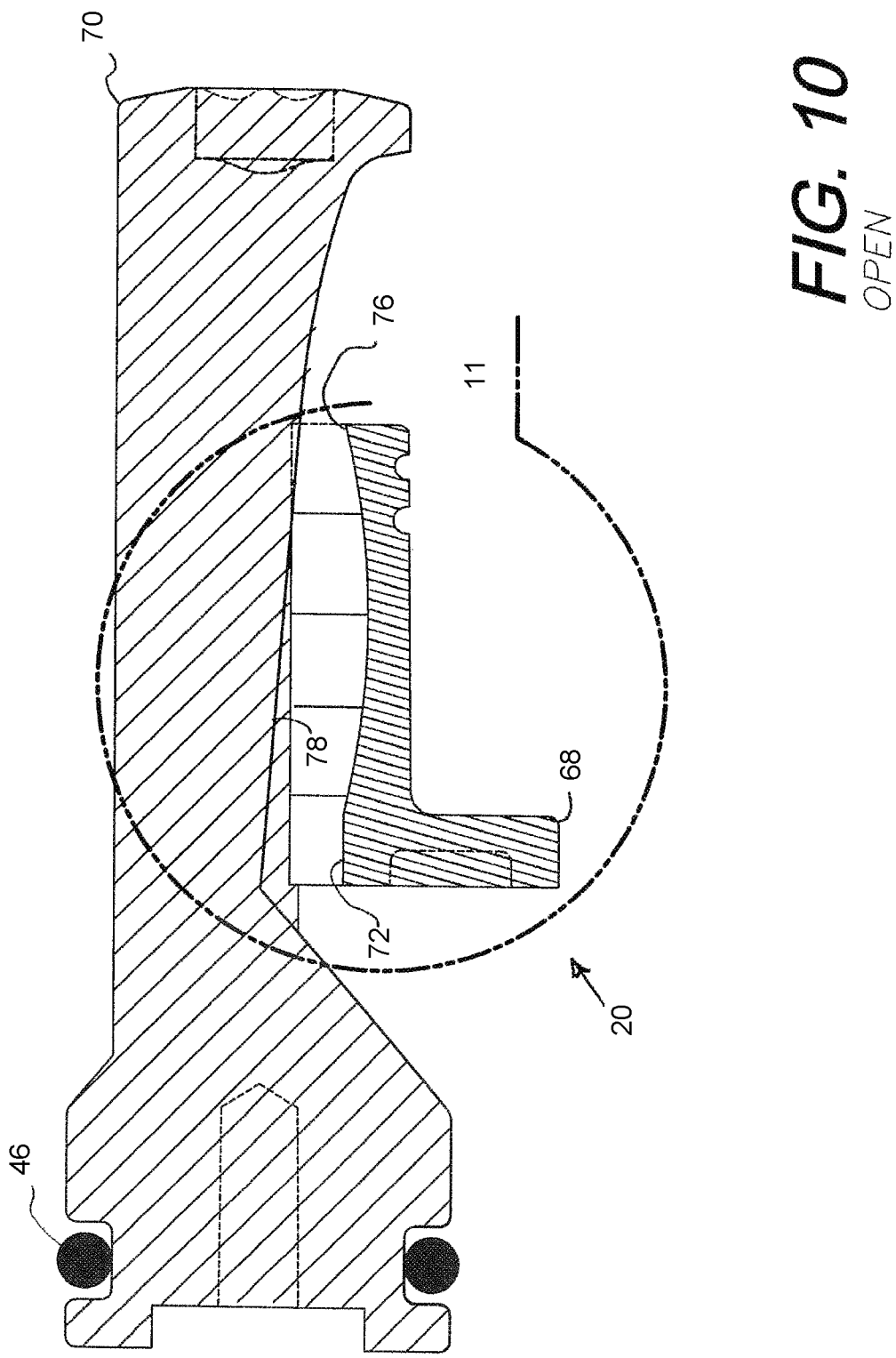
Figure 11:
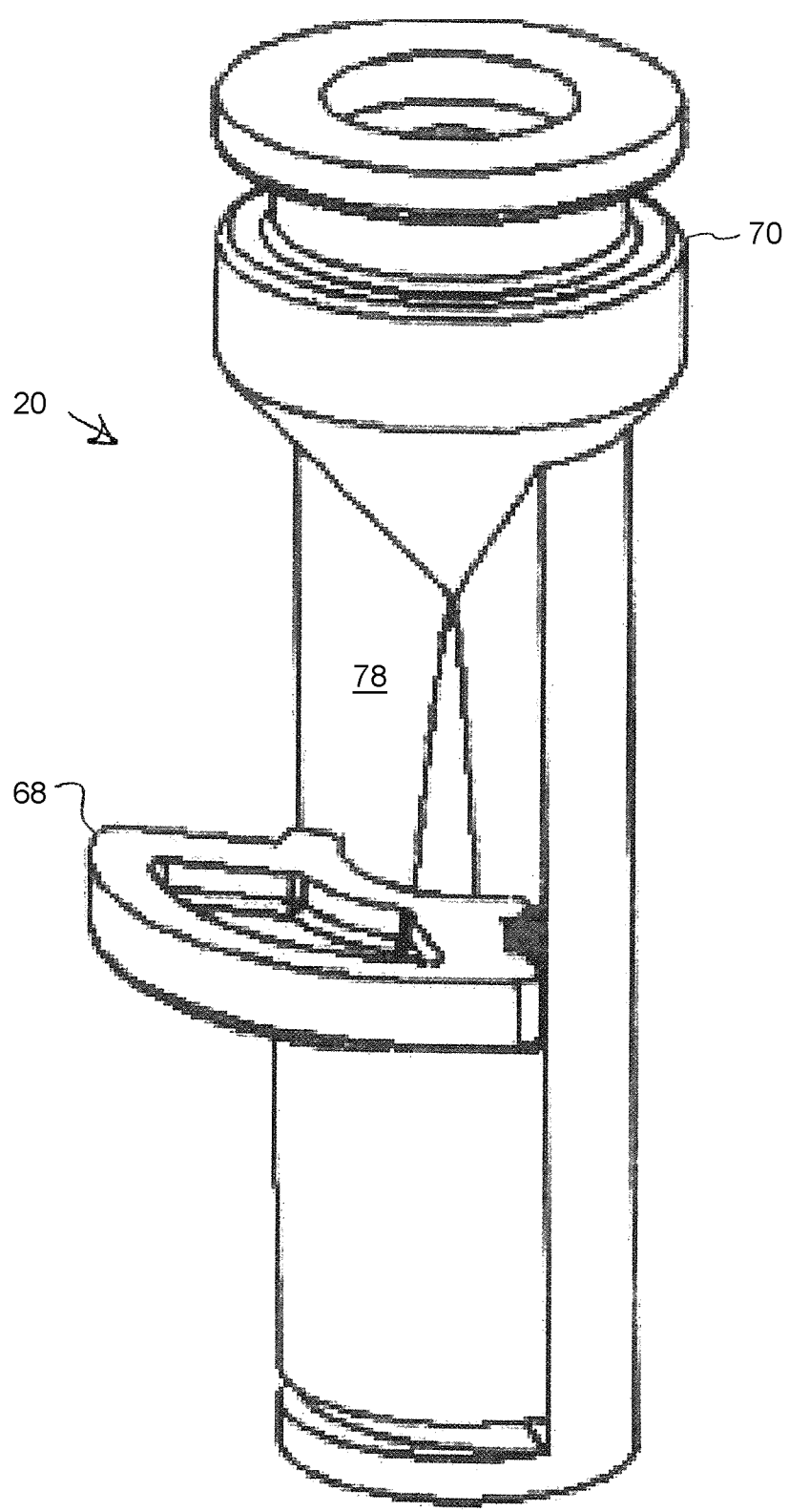
Figure 11A:
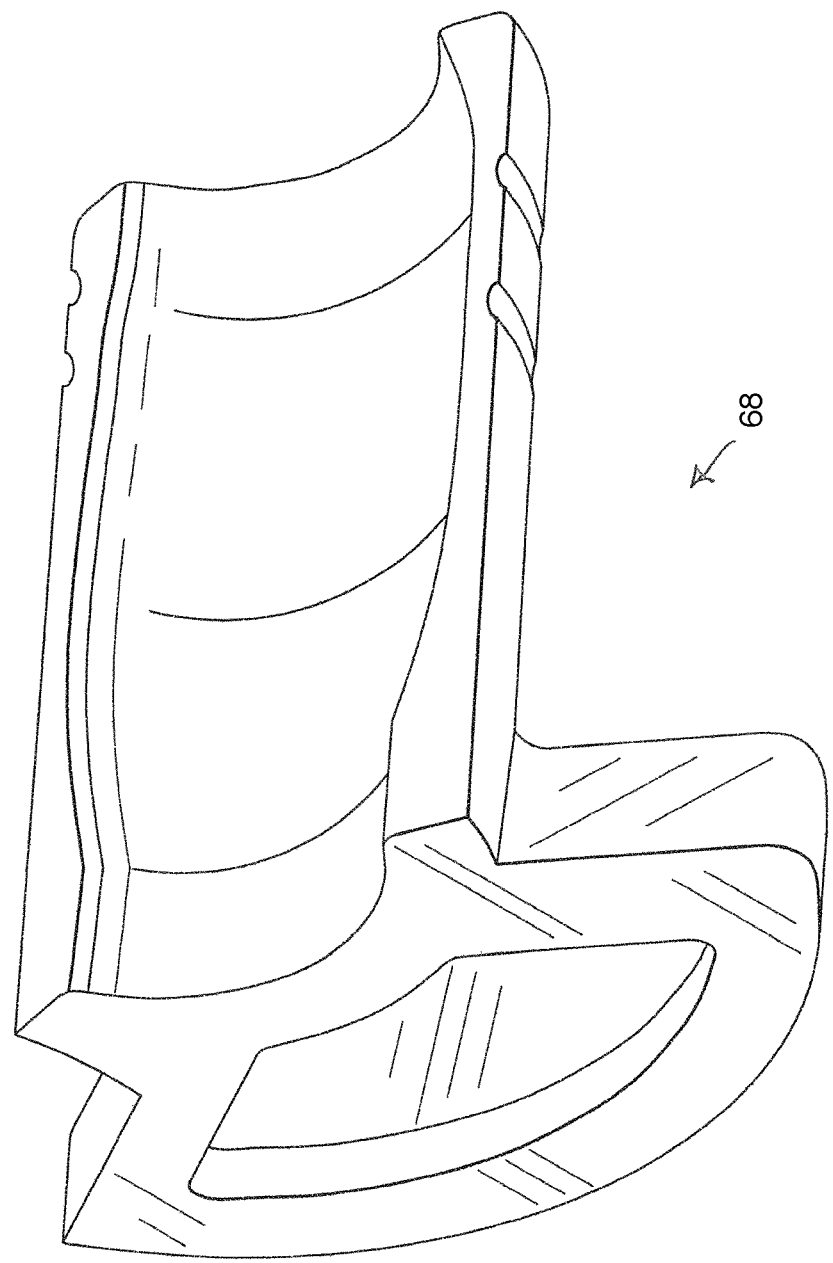
Figure 11B:
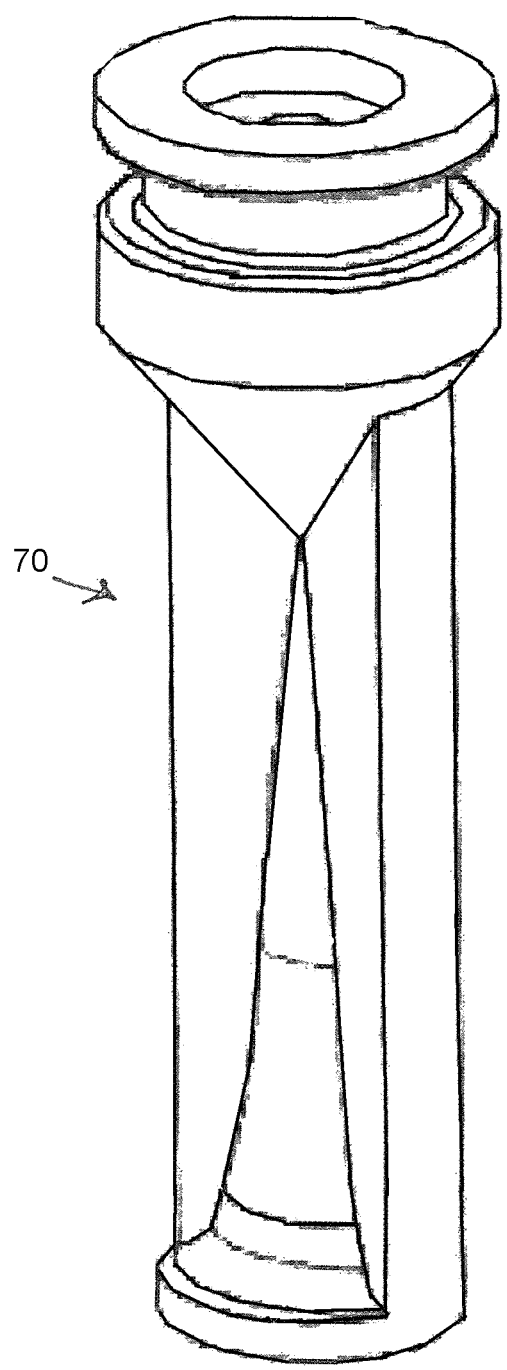
Figure 12:
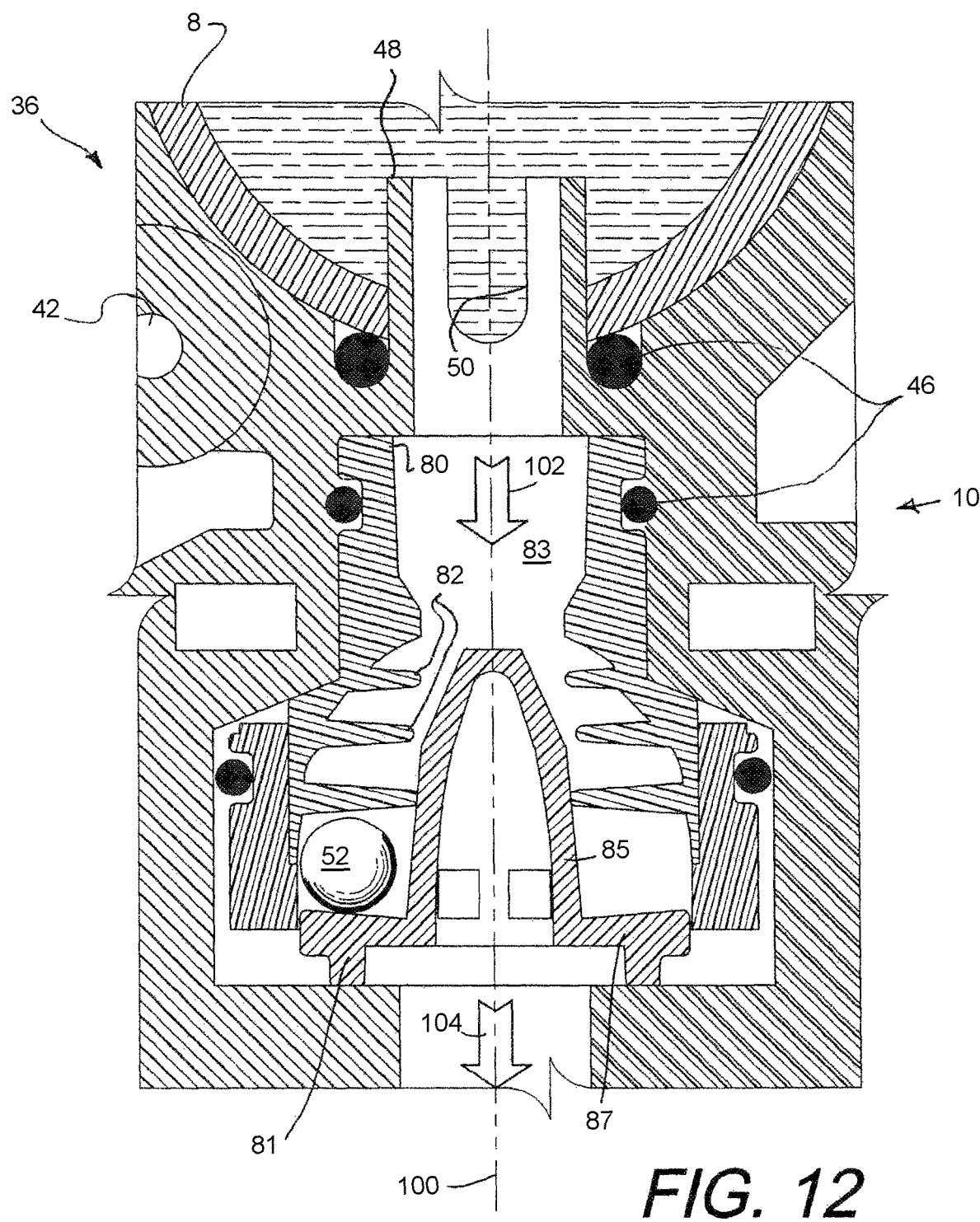

FIG. 7 shows the impinging valve 20 in a closed position. The impinging valve 20 opens and closes to discharge fluid and create a desired fluid flow. Acetyl thermoplastic can be used for forming the impinging valve 20 components, due to its resistance to chemicals and low coefficient of friction. The impinging valve 20 generally includes an impinging nozzle insert 68 (FIG. 11) and an impinging nozzle valve 70 with relatively precise dimensions and geometries for achieving a desired fluid flow. The impinging nozzle insert 68 and valve 70 are shown in FIG. 9 (closed) and FIG. 10 (open). The interaction between the insert 68 and about 70 create desired flow patterns at various flow rates. The impinging nozzle valve 70 slides along the insert 68 to effectively change the flow rate in droplet size of the fluid exiting the CVNS 4. The fluid first passes through orifice 72 on the insert 68, which creates an increase in the fluids velocity. A turbulence pocket 74 is formed between the insert 68 and the valve 70. The shape of the turbulence pocket 74 allows the fluid to swirl. The increased velocity of the fluid increases the turbulence of the fluid within the pockets 74. The fluid then exits the turbulence pocket 74 at a final orifice 76, which is the final interface between the valve 70 and the insert 68. As the valve 70 slides across the insert 68, the opening size of the final orifice changes, causing change in flow rate in droplet size of the fluid. Upon exiting the final orifice 76, the fluid follows the path of a ramp 78 formed by the impinging nozzle valve 70. The length of the ramp 78 should be long enough to create a flat sheet of fluid, but not so long as to allow the fluid sheet to re-convergence into streams after exiting the turbulence pocket 74.

With reference to FIGS. 12 to 14 the flow meter 10 comprises an upper section 80 and a lower section 81, one or both of which are preferably injection molded. The upper section 80 provides an outer wall of a chamber 83 through which the spray fluid flows. The lower section 81 comprises a cone portion 85 the projects away from a base portion 87 into the chamber 83. The cone portion 85 extends along a central axis 100 of the flow meter 10.

A fluid passage is defined through the chamber 83 from an inlet side 102 to an outlet side 104 between the inside surface of upper section 80 and an external surface of cone portion 85. Helical splines 82 are provided on an inner surface of the outer wall and serve to interact with the fluid to create a cyclone-like effect, which spins the flow meter sphere 52 inside the flow meter 10, along a circular path 106. The speed of revolution of the sphere 52 is proportional to the fluid flow allowing the flow rate of fluid running through the CVNS 4 to be measured. In a preferred embodiment of the flow meter 10, it comprises a clear material so that the motion of the sphere 52 inside can easily be read. In an alternative embodiment, magnetic sensors, acoustic sensors or ultrasonic sensors can be used.

An important characteristic of this particular flow meter design is its ability to measure very low flow rates and rapidly changing flow rates with high accuracy. This is due to the low friction and low inertia of the sphere arragement. In a preferred embodiment, the density of the sphere material should match that of the spraying liquid. For example, acrylic material, or plexiglass, with a density of 1.17-1.20 g/cm$^3$, is particularly suited to spraying liquids with a density close to 1.0 g/cm$^3$.

Figure 14:
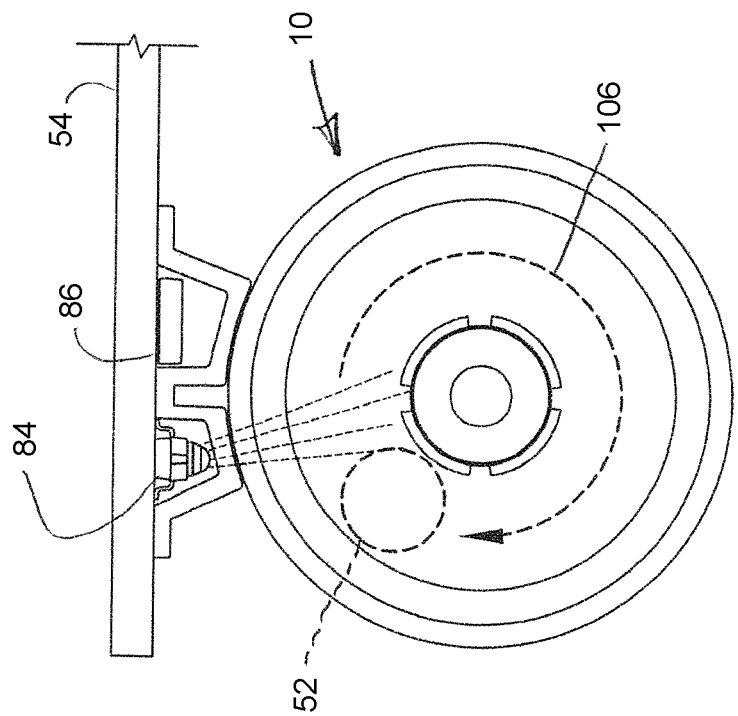
Figure 13:
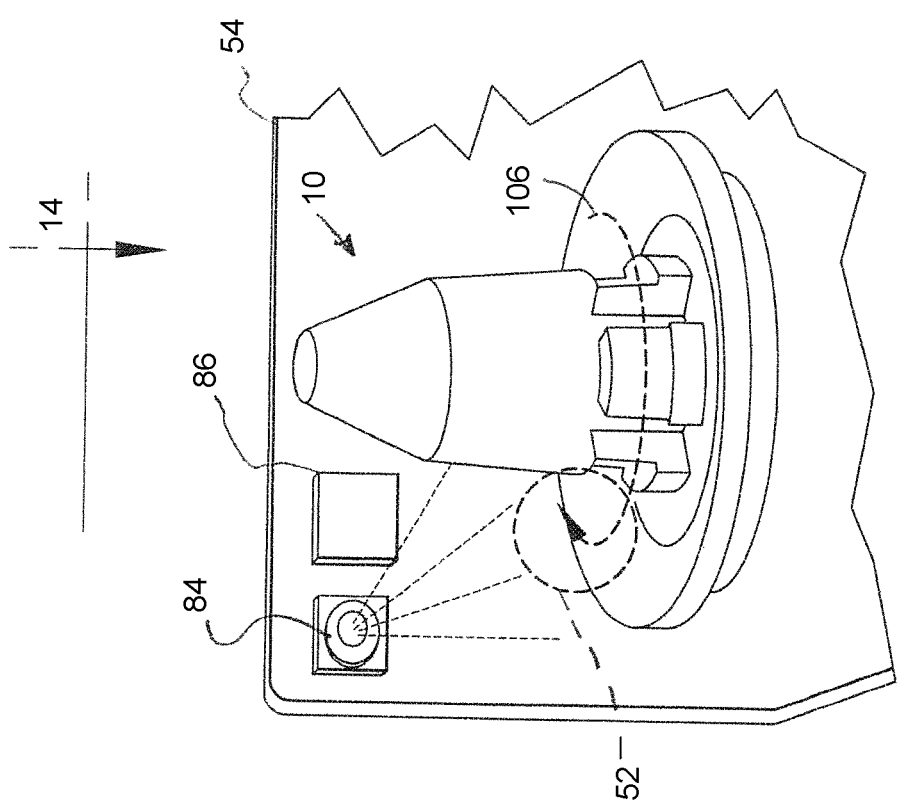

As shown in FIGS. 13 and 14, an LED 84 and a photo-diode 86 are mounted on the inside of the PCB 54, facing the flow meter 10. The LED, or other suitable light source, illuminates the sphere 52, which reflected light is sensed by the photodiode 86, which provides an output signal as an input to the microprocessor 12 for counting passes by the sphere 52, thus enabling computing flow rate. The configurations of the sphere 52, the LED 84 and the photodiode 86 are very able to accommodate different fluid properties and other conditions, which can include fluid collar, turbidity, contamination and dulling of the optically relevant surfaces of the device, which can occur from aging and hazing effects on plastics. The output of the photodiode 86 is an input to a trans-impedance amplifier, followed by an analog low pass filter with a predetermined cutoff frequency. These components can be incorporated into the flow meter 10 and/or the processor 12, which interact. The resulting voltage-based signal is output as an input to the processor 12, which samples the analog signal with an analog-to-digital (A/D) converter. Signal processing techniques are utilized to determine the fluid flow rate. O-rings 46 or other sealing measures are utilized to prevent fluid from entering the top of the nozzle body enclosure. As an alternative implementation, the output of the trans-impedance amplifier can be utilized as input to a compared tour to generate a digital signal the digital signal can provide input to a timer/capture/compare unit on the processor to measure the time between pulses corresponding to sphere passes by the photodiode.

For many agricultural operations the discharge from the CVNS 4 will be through the impinging valve or nozzle subassembly 20. Alternatively, a lower discharge tube 88 can be provided and can include lugs 90 for removably mounting a cap 92 for closing the discharge tube 88. Alternatively, the cap 92 can be replaced with or connected to a suitable spray discharge nozzle (not shown) for bypassing the impinging valve or nozzle subassembly 20 in operation.

Alternative flow meters include, without limitation, thermal mass flow meters, ultrasonic flow sensors, electromagnetic flow meters, acoustic material flow meters and sensors, impeller flow meters, axial turbine flow meters, paddlewheel flow sensors, and a standalone flow meter spray system component that is unconnected to the needle and impinging valves 14, 20.

Although the spraying system is particularly suited for agricultural applications, various other applications for flexibly controlling and managing the flow of liquid material can be accommodated. For example, prescription farming operations can benefit from such control measures. Farmers and other machine users can thus place water, chemicals, liquid fertilizers, or any other liquid material, as well as controlling quantities deposited. Such control provides a solution to the issues such as over-application and underapplication of liquid material.

Other undesirable consequences, which can be mitigated with the present invention, include drift with airborne droplets, issue is exacerbated with smaller droplet sizes. Application on unintended target areas can thus be mitigated. Moreover, the present invention can communicate with a control system on a machine, such as a vehicle, for navigating and controlling precision farming operations. Such navigational and positioning systems can include a global navigation satellite system (GNSS), e.g., the U.S.-based global positioning system (GPS). Real-time kinematic (RTK), inertial and other navigational/positional procedures can also be used. Interactive communication with vehicles and other equipment and machines can coordinate and control other aspects of precision farming and other operations. For example, multiple CVNSs 4 can be selectively and individually controlled, or can be controlled collectively in sections or on entire implements.

It is to be understood that the invention can be embodied in various forms, and is not to be limited to the examples discussed above. The range of components and configurations which can be utilized in the practice of the present invention is virtually unlimited.

The invention claimed is:

1. A continuously variable nozzle system configured for connection to a spray liquid source and configured for continuously, variably controlling a spray characteristic, the nozzle system comprising:
    a nozzle body with an inlet and an outlet;
    a conduit between the inlet and the outlet;
    a flow control valve disposed in the conduit,
    an actuator for controlling the flow control valve;
    an impinging valve disposed in the conduit downstream of the flow control valve;
    a further actuator for controlling the impinging valve, wherein the impinging valve serves to modify a mean droplet size of a spray;
    a flow meter disposed in the conduit;
    wherein the flow meter comprises:
        a chamber with internal helical splines configured to interact with a spray liquid passing through the chamber and create a cyclone-like effect;
        a sphere disposed inside the chamber for free movement along a circular path; and
        a sensor disposed outside the chamber and configured to detect motion of the sphere and generate an output signal in response to detected motion.

2. The nozzle system of claim 1, wherein the flow meter comprises an upper section, wherein the upper section comprises an outer wall of the chamber, and wherein the helical splines are provided on an inner surface of the outer wall.

3. The nozzle system of claim 2, wherein the flow meter further comprises a lower section comprising a cone that projects from a base portion into the chamber, wherein the cone is aligned on a central axis, and wherein the circular path is disposed between the cone and the outer wall.

4. The nozzle system of claim 2, wherein the upper section comprises a transparent material.

5. The nozzle system of claim 4, wherein the sensor is a photodiode.

6. The nozzle system of claim 5, further comprising a light source mounted outside the chamber and configured for illuminating the sphere.

7. The nozzle system of claim 1, further comprising a printed circuit board upon which the sensor is mounted, wherein the printed circuit board is mounted inside the nozzle body.

8. The nozzle system of claim 1, wherein the nozzle body comprises enclosure walls that define an enclosure, and wherein the system further comprises a seal between the flow meter and the enclosure walls to prevent the spray liquid from entering a portion of the enclosure outside of the conduit.

9. The nozzle system claim 1, wherein the flow control valve is disposed downstream of the flow meter.

10. The nozzle system of claim 1, wherein the flow control valve is a needle valve.

11. The nozzle system of claim 1, wherein the actuator is a stepper motor.

12. The nozzle system of claim 1, further comprising an electronic controller that is in communication with the sensor and is configured to compute a flow rate from the output signal.

13. The nozzle system of claim 1, further comprising an electronic controller that is in communication with the sensor and the actuator, and wherein the controller is configured to compute a flow rate from the output signal and control the actuator in dependence upon the flow rate.

14. The nozzle system claim 13, further comprising a pressure sensor mounted in the conduit downstream of the flow meter and configured to generate a pressure signal, wherein the controller is in communication with the pressure sensor and configured to receive the pressure signal.

15. The nozzle system of claim 14, wherein the controller is configured to control the actuator in dependence on the pressure signal.

16. An agricultural sprayer comprising a plurality of the nozzle systems of claim 1.

17. The nozzle system of claim 8, wherein the seal comprises at least one O-ring.

* * * * *